(12) United States Patent
Hinkel

(10) Patent No.: US 10,191,638 B2
(45) Date of Patent: Jan. 29, 2019

(54) METHOD FOR THE PARAMETER CHANGE OF PARAMETERISABLE FUNCTIONS BY MEANS OF DATA PROCESSING DEVICES COMPRISING A POINTING MEANS AND A DISPLAY OF A TOUCHSCREEN DEVICE

(71) Applicant: MOBOTIX AG, Winnweiler (DE)

(72) Inventor: Ralf Hinkel, Horingen (DE)

( * ) Notice: Subject to any disclaimer, the term of this patent is extended or adjusted under 35 U.S.C. 154(b) by 252 days.

(21) Appl. No.: 14/383,381

(22) PCT Filed: Mar. 3, 2013

(86) PCT No.: PCT/DE2013/000112
§ 371 (c)(1),
(2) Date: Sep. 5, 2014

(87) PCT Pub. No.: WO2013/131507
PCT Pub. Date: Sep. 12, 2013

(65) Prior Publication Data
US 2015/0033163 A1    Jan. 29, 2015

(30) Foreign Application Priority Data
Mar. 7, 2012  (DE) .......................... 10 2012 004 327

(51) Int. Cl.
| | |
|---|---|
| H04N 1/60 | (2006.01) |
| G06F 3/0482 | (2013.01) |
| G06F 3/0485 | (2013.01) |
| G06F 3/0481 | (2013.01) |
| G06F 3/0484 | (2013.01) |

(52) U.S. Cl.
CPC ........ *G06F 3/04847* (2013.01); *G06F 3/0482* (2013.01); *G06F 3/0484* (2013.01); *G06F 3/0485* (2013.01); *G06F 3/04817* (2013.01); *H04N 1/6027* (2013.01)

(58) Field of Classification Search
CPC ............. G06F 3/04817; G06F 3/04847; G06F 3/0484; G06F 3/0481
USPC ................................... 715/765, 833
See application file for complete search history.

(56) References Cited

U.S. PATENT DOCUMENTS

| | | | |
|---|---|---|---|
| 2003/0125776 A1* | 7/2003 | Turney ............... | A61N 1/37247 607/27 |
| 2004/0021647 A1* | 2/2004 | Iwema ................. | G06F 3/0488 345/179 |
| 2004/0216058 A1* | 10/2004 | Chavers ............... | G06F 3/0481 715/810 |
| 2006/0143571 A1* | 6/2006 | Chan ................... | G06F 3/03543 715/764 |
| 2007/0061732 A1* | 3/2007 | Bobbin .............. | G06F 3/04817 715/739 |

(Continued)

FOREIGN PATENT DOCUMENTS

| | | |
|---|---|---|
| EP | 2 163 977 | 3/2010 |
| EP | 2 211 258 | 7/2010 |

(Continued)

*Primary Examiner* — Kieu D Vu
*Assistant Examiner* — Roberto Borja
(74) *Attorney, Agent, or Firm* — Kagan Binder, PLLC

(57) ABSTRACT

Described are methods for the parameter change of parameterized functions for technical devices by means of a data processing device comprising pointing means and a display on which a sliding bar with corresponding sliding element is shown for the parameter change.

8 Claims, 3 Drawing Sheets

(56) References Cited

U.S. PATENT DOCUMENTS

Figure 1:
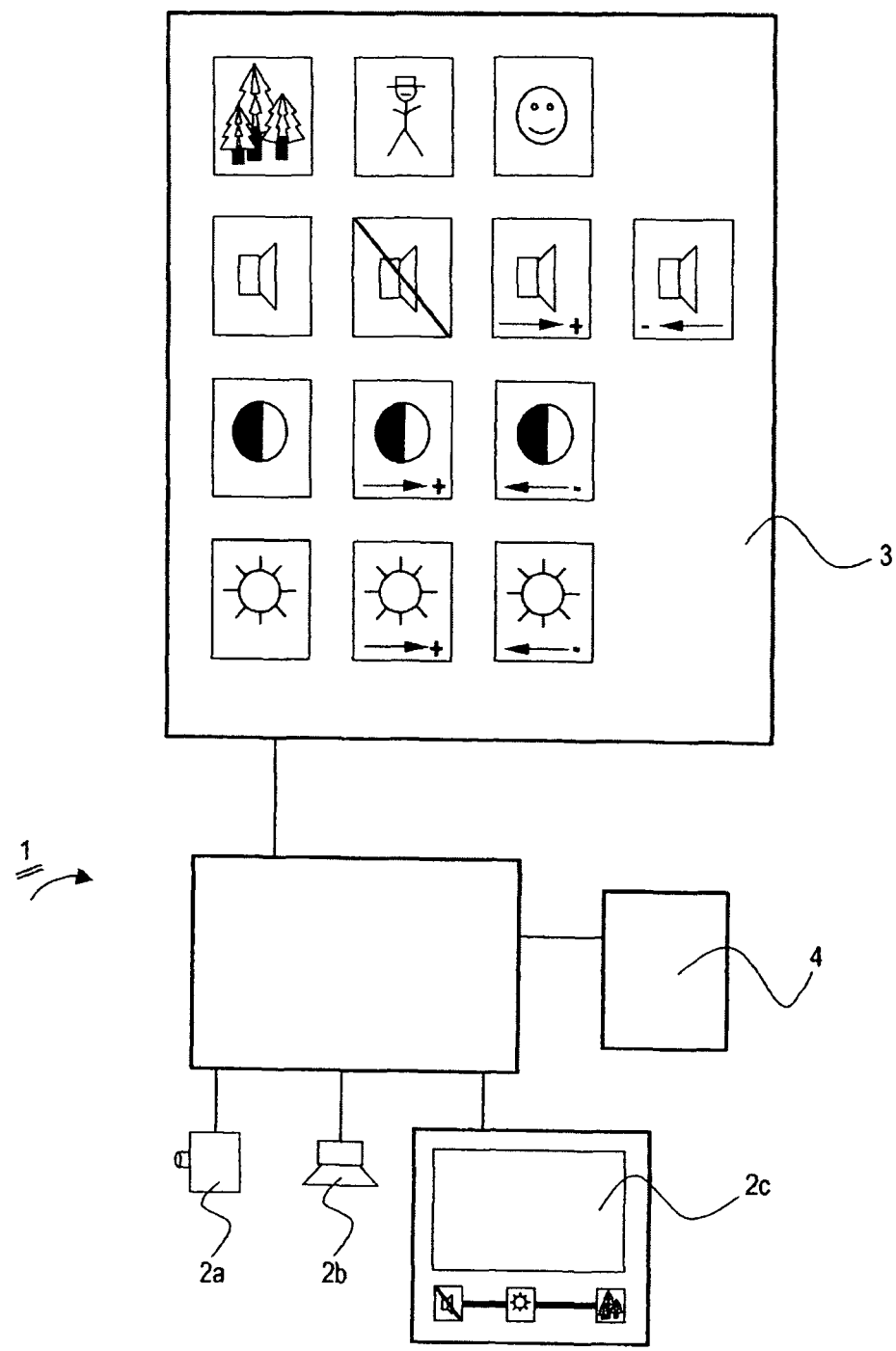

| | | | |
|---|---|---|---|
| 2007/0083825 A1* | 4/2007 | Chaudhri | G06F 3/0481 |
| | | | 715/788 |
| 2007/0097090 A1 | 5/2007 | Battles | |
| 2009/0128500 A1* | 5/2009 | Sinclair | G06F 3/04883 |
| | | | 345/173 |
| 2009/0222757 A1* | 9/2009 | Gupta | H04N 5/44543 |
| | | | 715/776 |
| 2009/0276731 A1 | 11/2009 | Yamakawa | |
| 2010/0058228 A1* | 3/2010 | Park | G06F 3/04847 |
| | | | 715/786 |
| 2010/0185976 A1* | 7/2010 | Sadanandan | G06F 3/0485 |
| | | | 715/786 |
| 2010/0306704 A1* | 12/2010 | Cotterill | G06F 3/0485 |
| | | | 715/833 |
| 2011/0025924 A1* | 2/2011 | Price | G06F 3/04847 |
| | | | 348/734 |
| 2012/0109348 A1* | 5/2012 | Matsunaga | G06F 3/04847 |
| | | | 700/94 |
| 2013/0093689 A1* | 4/2013 | Papakipos | G06F 1/1626 |
| | | | 345/173 |
| 2013/0239057 A1* | 9/2013 | Ubillos | G06F 3/04855 |
| | | | 715/833 |
| 2013/0346897 A1* | 12/2013 | Warner | G06F 3/04847 |
| | | | 715/769 |

FOREIGN PATENT DOCUMENTS

| | | |
|---|---|---|
| EP | 2 538 316 | 12/2012 |
| GB | 2495270 | 4/2013 |

* cited by examiner (I)

(II)

(III)

(IV)

METHOD FOR THE PARAMETER CHANGE OF PARAMETERISABLE FUNCTIONS BY MEANS OF DATA PROCESSING DEVICES COMPRISING A POINTING MEANS AND A DISPLAY OF A TOUCHSCREEN DEVICE

RELATED APPLICATION

This application claims the benefit from International Application No. PCT/DE2013/000112, filed Mar. 5, 2013, which in turn claims priority from German Application having number 10 2012 004 327.9, filed on Mar. 7, 2012, both of which are incorporated herein by reference in their entireties.

The present invention relates to the subject-matter claimed in the preamble and, therefore, it relates to the parameter change of parameterizable functions of technical devices by means of a data processing device.

Data processing devices such as computers, laptops, iPhones, etc., include a plurality of technical devices with parameterizable functions. For example, in a mobile data processing device, the cameras installed therein can be activated, zoomed, and the brightness, color saturations, contrasts, etc. can be changed, microphones can be activated or deactivated, the microphone sensitivity can be adjusted. Moreover, by means of the data processing device, external devices such as firmly installed monitoring cameras can be controlled.

For changing parameters, a sliding bar with a corresponding sliding element is, as a rule, shown to the user of the data processing device in a display, wherein sliding of said sliding element by means of a pointing means results in a change in the assigned parameter. Reference is made, for example, to the controllers for volume, microphone sensitivity, etc. provided in MICROSOFT Windows operating systems.

Particularly in case the display is only small, like in typical mobile data processing devices such as, for example, mobile phones with advanced functionality, it is desirable to allow the user to change the parameters in an intuitively easily operable manner, with at the same time only minor requirements as to the computing performance being necessary and without affecting the display by too large elements.

The present invention deals with the problem of providing new subject-matter for industrial applications.

The solution to this problem is claimed in independent form. Preferred embodiments are shown in the dependent claims.

Hence, the present invention deals with a method for the parameter change of parameterized functions for technical devices by means of a data processing device comprising a pointing means and a display in which a sliding bar with corresponding sliding element is shown for the parameter change, said method comprising the steps that it is detected or a detection occurs if the pointing means is pointed thereon and the pointing means is actuated for the parameter change, and a parameter change is made on the basis of the detected pointing means movement, wherein it is intended that a plurality of icon images are saved on the data processing device for a plurality of parameters, which can each be uniquely assigned to the respective parameterized functions, a plurality of the saved icons to be uniquely assigned are loaded for different parameters, a desired or setpoint order or sequence of the icons is determined, a display with the sliding bar and a plurality of icons arranged thereon according to the determined desired order is generated, it is detected if the pointing means is pointed to one of the icons and the pointing means is actuated and, in response, a parameter change is made on the basis of a current parameter size of the parameterized function assigned to the selected icon.

A first basic idea of the present invention is thus based on the finding that, without affecting the intuitive operability, a sliding bar/sliding element can be adjusted by means of data processing devices even if the sliding bar is used for a plurality of selectively selected sliding elements commonly but alternatingly and thus not simultaneously and, therefore, the arrangement of the sliding element in accordance with a current parameter value of the parameterized function is not or not always possible. The described method can be implemented and carried out with little effort. At the same time, the display resolution available for an image, portion of a document, etc. to be displayed is increased although control elements are shown, because only one sliding bar has to be displayed. This at the same time allows the user to more precisely control, for example, the brightness, the color saturation or the contrast of an image.

In addition to the control operations of the data-processing device itself such as, for example, microphone sensitivity, replay volume, contrast, color saturation, brightness, in particular the activation of technical devices such as, for example, webcams, should be taken into consideration as parameterizable functions. Here, for example, also a zoom factor can be changed in relatively large steps, for instance in an alternating manner between extreme wide angle, wide angle, normal perspective and tele-perspective, or in substantially smaller steps and thus almost continuously acting, i.e. discrete steps, just as color saturation, brightness, resolution, frame rate or contrast of the video streams generated by means of the camera. Furthermore, pan and title adjustments and/or other, also more complex functions or operating parameters can be selected. For example, it is also possible to navigate in recordings or files, i.e. to search for a specific point or passage. The intuitive operability is not affected even if—after the change of a parameter, i.e. after completed actuation of a sliding bar element—the displayed position of this sliding element or other sliding elements changes on the sliding bar, although the corresponding parameters do not change. This change in the position of sliding elements on the sliding bar after completion of a sliding operation or possibly even during a sliding operation can take place in that the just actuated sliding element displaces other elements and/or in that these other sliding elements on the sliding bar, after completion of the operation, move, i.e. displace the just actuated element in the position on the sliding bar without parameter changes being involved. It is pointed out that adjustments in quasi continuously acting, i.e. discrete little steps can be considered to belong to multistep-variable parameters.

The method can advantageously and preferably be carried out by means of mobile data processing devices, in particular devices comprising an integrated display such as a touch screen, i.e. a touch-sensitive monitor. Such devices can in particular be mobile telecommunication devices such as mobile phones with functions going beyond telephony, e.g. iPhones. It is pointed out that the method is suitable for being coded so as to be automatically operated, e.g., by means of applets or programs, wherein in the present case, however, no protection is claimed for a specific software program.

It is possible to provide a touch-sensitive monitor as display, also independent of whether a mobile data processing device is used or not. It is particularly preferable if the touch-sensitive sensor can also detect the touching pressure and increases the parameter change speed in response to an increased touching pressure of a finger or pointing element against the touch-sensitive monitor. This allows a particularly intuitive operation.

Alternatively and/or additionally, the distance of a finger contact point transversely to the sliding bar can be determined and used for changing the adjustment sensitivity. In such a case, e.g., a parameter such as the volume is changed roughly during a movement parallel to the sliding bar as long as the finger is directly over the sliding bar shown on a touch screen, and in case of a movement parallel to the sliding bar and having the same length, it is finely changed when the finger is moved some distance away from the sliding bar shown on the touch screen. The principle of selecting the sensitivity of the adjustment dependent on the distance of the pointing means from the shown sliding bar also makes sense for other variables, for example the "fast forward speed" or "jumping distance" when navigating in recordings. In this connection it turned out to be particularly intuitive to make major changes in the parameters when moving the finger or pointing element directly on the displayed sliding bar and to make minor changes in the parameter to be changed per movement path when the finger or the pointing element is moved slightly spaced from the sliding bar but parallel thereto over the display. This is intuitive because the user typically wants to move the finger away from the sliding bar when he/she just wants to make only minor changes.

It is pointed out that this kind of sensitivity change of an actuating element depending on the distance of the pointing means from the sliding bar also makes sense if—different from the principles of the invention discussed apart from that—only one single parameter is changed, i.e. only one sliding element is permanently shown on the sliding bar.

It is also pointed out that there are also other ways of changing the sensitivity. For example, in a touching pressure-sensitive display, the touching pressure can be detected as the value changing the sensitivity to the movement of the pointing means. Just in case the sensitivity of the parameter change is variable, as shown above on the basis of several examples, it makes sense to display the current sensitivity to changes. For example, when "navigating" in recordings, the jumping distance can be shown per movement, or at the icon or by selecting an icon. For example, if a movement of the finger across the sliding bar itself leads to two-hour jumps, while in case of a movement closely to the sliding bar but no longer on it, a jumping distance of only half an hour can be selected, and if the pointing means is more distant, very fine widths of one minute can be jumped, it is possible to show next to the respective icon, for example, a speech bubble with "2 h", "30 min" and "1 min", respectively. Without any adjustment, the user can thus sensitively make changes and at the same time knows the degree of sensitivity. The display of such a speech bubble is advantageous in particular in case of touch screens because the finger moving the icon normally hides the icon. By displaying it next to the icon, it can be guaranteed that the finger does not also hide the speech bubble. In mobile data devices comprising an orientation sensor for detecting the spatial orientation of the mobile data device, the speech bubble can—depending on the orientation—be displayed above the icon if there is enough space on the display. Thus, preferably also means are provided for arranging the speech bubble depending on the detected orientation of a display. Moreover, the speech bubble can be partly transparent.

It is stressed that displaying a speech bubble at an icon that is movable on a sliding bar as a reference to the current sensitivity as well as changing the sensitivity depending on the contact pressure and/or the distance from the sliding bar are considered to be inventions per se and that moreover a particularly advantageous variant of the thus co-disclosed inventions is considered to be the combination of these particular features. We reserve the right to file divisional applications based thereon.

It is possible and preferred if the data processing device provides a plurality of icons for each parameterizable function which should be changeable in accordance with the invention and if additionally a step is carried out by means of which a specific icon is selected. The selection can be made depending on a current parameter, for example, in order to show whether a camera currently provides pictures in a wide angle or tele mode or whether a volume cannot be increased or lowered further. At the same time, a deactivation of a technical device such as a microphone can be cancelled if required.

It is possible to fade out other icons selectively as soon as a parameterizable function for a parameter change is selected by selecting or clicking a specific icon. Faded out icons can remain faded out until a change has been completed or, if necessary, even a short period longer in order to easily allow resetting of a changed parameter. After changing a parameter, the step of adapting the desired position and/or desired order of the icons can be performed, if necessary. Instead of fading out currently non-used icons, it might also be preferred to change the icon, for instance to semi-transparent, de-colored, smaller and/or more low-contrast icons. These non-used icons can be hidden by an icon moved during use.

The desired position or desired order of the icons on the sliding bar is preferably determined in accordance with the frequency with which the parameterizable function belonging to the respective icon was called before during a predetermined time period or altogether, wherein rarely used icons are preferably arranged farther outside, and/or defined depending on whether a specific sliding bar element belongs to a comparatively high or low parameter which, in particular, should not be increased or lowered further. However, it is pointed out that this is only preferred but not compulsory.

The desired position is typically determined by taking into account the desired position resulting for other icons in accordance with the same rules. For example, points can be assigned in order to determine a desired order of an icon in accordance with an altogether added amount of points; in case of equal points, a desired order can be used, which can also be used when operating the device for the first time without history statistics and/or in case the parameter values are continuously average. If applicable, when determining the desired position on a sliding bar, an arrangement of icons can always only be made on fixed grid dots which form a coarse screen against the display resolution. It is possible to weight the plurality of influencing values for determining the desired position and/or desired order, e.g., in order to assign to a parameterized function which can only be changed in one direction such a weighting that the corresponding icon is displaced far to the end of the sliding bar even if it was used only shortly before. It goes without saying that the desired order and/or desired position can always be newly determined, preferably after each parameter change.

This can be done as described above; until the icon position is newly determined, icons that have not been changed recently can remain faded out or semi-transparent.

It is possible to move currently non-actuated icons such as if they were rigid bodies which displace each other, for example balls, wherein the non-used icons are displaced as if a ball hit them from above. It can be intended that displaced icons remain in direct contact with the last actuated icon or are positioned at a distance therefrom. Moreover, it can be intended that a displaced icon itself displaces other icons. If applicable, this can be calculated during actuation of the pointing means with only a slight load on the data processing device. It is stressed that after actuation of an icon, the position of the actuated icon and/or other icons can be changed, but that such position changes which are caused by the device and not by the user and which are due to an icon actuation and only serve for achieving a changed display do not involve parameter changes. Instead of making statistics, it is moreover possible to position the icons exactly or approximately at the place where the parameter change is completed and then "displace" the icons close to this place and/or simulate an alternating displacement. This alternating displacement can then continue to icons adjacent to the displaced icons, i.e. icons being farther away from the displaced icon.

It is pointed out that the sliding bar can typically be provided close to the display and at an edge thereof, namely in particular depending on the position at a longitudinal or transverse edge. In such a case, both an icon orientation and the sliding bar orientation can be selected so as to be sensor-dependent, i.e. dependent on an orientation sensor, and/or adapted to a portrait or landscape display format. It is also disclosed that accordingly the desired position can be adapted, if required, for example because in case of an arrangement at a relatively long display edge, the distance between icons can be relatively large.

It is possible to select the sensitivity of the parameter change upon actuation of the pointing means in a manner dependent on the movement of the pointing means, for example, the movement along the sliding bar, and/or to change it dependent on the duration of the pointing means actuation, in particular in case the pointing means is moved on the sliding bar some distance on the sliding bar in a direction which shows the sign of the desired parameter change and/or the intensity of the pointing means actuation, e.g., the contact pressure on a touch screen. In particular the combination of duration of the pointing means actuation and a possibly only slight movement of the pointing means along the sliding bar for a parameter change allows a sensitive adjustment also in case of badly resolutive pointing means such as coarsely operating touch-sensitive displays. In this manner it can particularly well be compensated for that, possibly because of the use of only one single sliding bar, the respective position of a currently relevant icon no longer allows a parameter change which linearly corresponds to the sliding bar distance, as desired per se. Alternatively and/or additionally, the cross-distance from the sliding bar can be evaluated as a value influencing the sensitivity of the adjustment.

It is pointed out that the selection of the icon and/or the parameterizable functions, which are in principle arranged on the sliding bar, can preferably be configured by a user.

Figure 2:
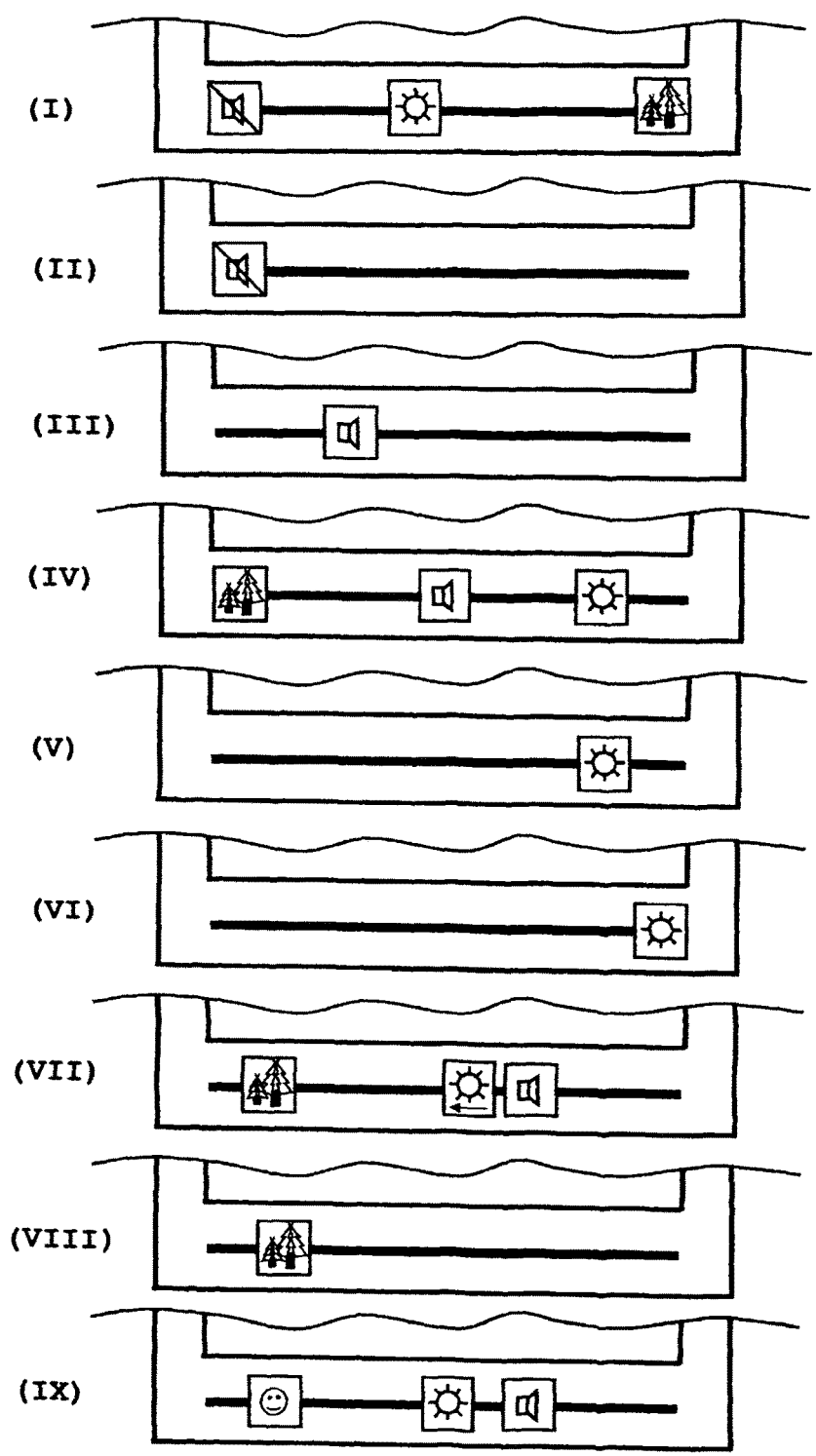
Figure 3:
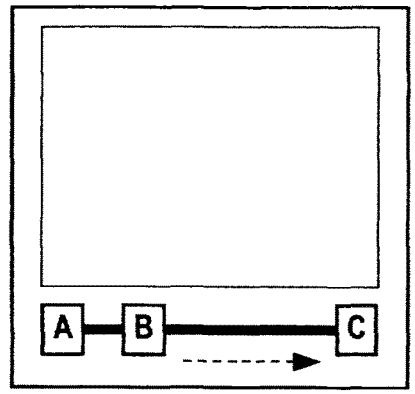
Figure 3:
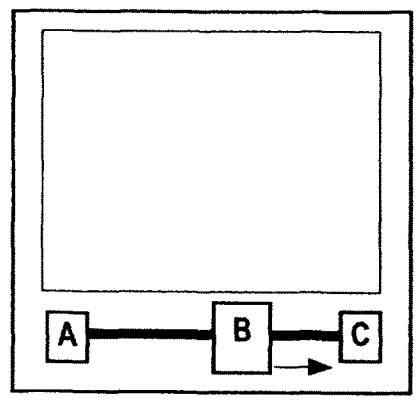
Figure 3:
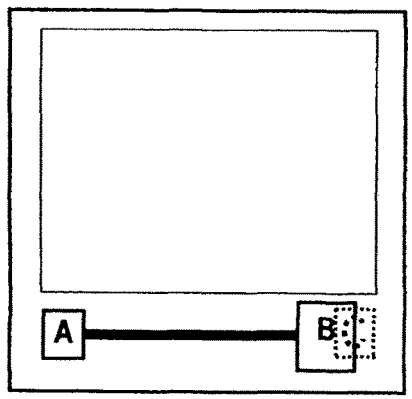
Figure 3:
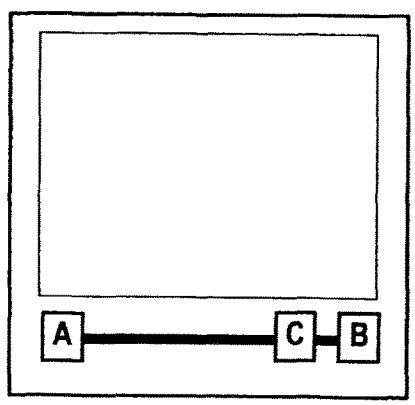

In the following, the invention will be described only exemplarily on the basis of the drawings in which FIG. 1 shows a data processing device according to the method of the present invention, FIG. 2 shows examples of changing displays of the sliding bar during execution of the method, FIG. 3 shows an alternative embodiment of the invention.

In accordance with FIG. 1, a data processing device 1 is provided, which is generally marked with reference number 1, for executing a method for the parameter change of parameterized functions for technical devices by means of a data processing device comprising pointing means and a display, in which a sliding bar with corresponding sliding element is shown for the parameter change, in order to allow a detection if the pointing means is pointed thereon and the pointing means is actuated for the parameter change, and a parameter change is made on the basis of the detected pointing means movement, wherein the steps are carried out that a plurality of icon images are saved on the data processing device for a plurality of parameters, which can each be uniquely assigned to the respective parameterized functions, a plurality of the saved icons to be uniquely assigned are loaded for different parameters, a desired order of the icons is determined, a display with the sliding bar and a plurality of icons arranged thereon according to the determined desired order is generated, it is detected if the pointing means is pointed to one of the icons and the pointing means is actuated and, in response, a parameter change is made on the basis of a current parameter size of the parameterized function assigned to the selected icon.

The data processing device 1 is connected to a plurality of electrical devices 2a, 2b, 2c having parameterizable functions. The data processing device 1 has a display 2c which, in the present case, is realized as a touch-sensitive monitor and thus can also be used as pointing means. The data processing device 1 further comprises a memory 3 for a plurality of icons, and a memory 4 in which are stored: access statistics for the access to specific parameterizable functions as well as parameter values of the parameterized functions of the technical devices 2a, 2b, 2c connected to the mobile data processing device 1 for changing the parameters of its parameterized functions.

In the present embodiment, the mobile data processing device 1 is a mobile telephone, such as an iPhone, with a touch screen 2c, loudspeaker 2b and camera 2a. The camera 2a here has a zoom lens which can be changed between three zoom positions (wide angle, normal perspective and tele). The loudspeaker 2b can be deactivated or can be used for playing audio signals to be replayed with different amplification factors.

The display 2c can be changed in view of the brightness and contrast with, e.g., 16 steps. For example, also the volume of an audio signal to be replayed through the loudspeaker 2b can be changed in 16 steps.

It is pointed out that in addition to the described technical devices, also further devices can be controlled by the mobile data processing device 1, namely in turn again in view of their parameterizable functions, so that, e.g., a web camera can be remotely controlled in view of the frame rate, image resolution, zoom factor, brightness of the image stream to be reproduced, contrast, etc.; in the following, this will not be discussed in detail in order to keep the commentary simple, although it is a matter of fact to the person skilled in the art that in such a case the parameter change of the parameterized function of a remotely-controlled device through common protocols is easily possible, wherein the protocol-based communication between the mobile data processing device and the technical device to be controlled therewith is made in accordance with the desired parameters.

The display 2c serves, on the one hand, for reproducing a useful image, for example, for displaying documents, etc., and also for displaying control elements which, in the present case, are realized i.a. by a sliding bar and icons from the storage means 3, as will be described in detail. That in addition to the further display of documents, images, etc., also control elements are displayed here means that there can be a spatial separation of control elements and the surface intended for reproducing the other images, documents, etc., because the control elements are preferably arranged closely adjacent to the other display surface; however, if applicable, there can also be a cross-fading over an image, if this is desired by the user and/or in principle provided for in very small displays; in the latter case, the sliding bar and the icons to be reproduced thereon can be faded out when the pointing means has not been activated after a certain time or if the pointing means has only been activated away from the place at which the sliding bar should be displayed.

For each of the parameterized functions, the database in memory 3 comprises a plurality of icons to be uniquely assigned to the respective function. For example, three icons are provided for the zoom, namely one icon to be used as long as the zoom is in the wide angle position, one icon for reproduction as long as the zoom is in the normal position, and one icon as long as the zoom is in the tele position.

Four icons are provided for the loudspeaker, namely one icon to be used as long as the volume is in a middle range, one icon as long as the loudspeaker is deactivated, one icon as long as the loudspeaker is not deactivated but operated at a very low voice, and one icon for the case that the voice is already at a maximum. It is moreover pointed out that just the parameter change of the volume, but also of other values, can be performed such that it is changed at least temporally only between on and off. For example, by detecting a short or double tap on the volume icon, the loudspeaker can be put on mute or be reactivated after having been put on mute, wherein after reactivation, i.e. after cancellation of the muting, immediately the volume is used with which it was played before muting. Similar considerations are useful, for example, also for the short-term deactivation of microphones.

For the contrast control, three icons are provided, namely one icon to be used as long as the contrast is in a middle range, one icon as long as the contrast is adjusted to be minimally low, and one icon to be used as long as the contrast is adjusted to be maximally high.

Analogously, for controlling the brightness of the display, three icons are provided, namely one icon to be used as long as the brightness is in a middle range, one icon to be used as long as the brightness is minimal and can only be increased, and one icon to be used as long as the brightness is already at a maximum and can only be reduced.

The icons can be read out of the memory and automatically arranged over the display of a sliding bar in accordance with rules to be computed by a computer program. The adjustment is described in the following with reference to FIG. 2.

FIG. 2 first shows in FIG. 2-I the elements with sliding bar and a plurality of icons as well as the display elements, images, etc. In the following parts of the Figure, FIG. 2-II to FIG. 2-IX, only the sliding bar elements and the respective currently displayed icons are shown. It goes without saying that, as a rule, the documents and images, etc., are still displayed on the display during the shown phases and in the Figure the display has been restricted for reasons of clarity only.

Firstly, it is started out from a situation in which the loudspeaker is deactivated and the brightness of the display is in a middle range and the zoom is adjusted to wide angle. It is assumed that the mobile data processing unit 1 is configured such that the user is not offered the possibility of adjusting the contrasts.

By means of the touch screen serving as the pointing means, the volume is then selected as the function to be adjusted by moving the finger over the icon with the struck through loudspeaker, see FIG. 2-II, so that as a consequence the two icons not relating to the loudspeaker are faded out. The user can then move the icon, which is located close to the left end but is not arranged directly at the left end but spaced therefrom, in one of the two directions by simply double-clicking the icon showing the current deactivation of the loudspeaker in order to reactivate the loudspeaker. In the present case, the icon is simultaneously moved to the right, as shown in FIG. 2-III, which indicates that the user desires a reactivation of the loudspeaker and also an increase in the last used volume. This is symbolized already during activation in that the icon changes to a loudspeaker which is not struck through.

It is pointed out that it is preferred in cases like the present one, in which both a volume is changed and a loudspeaker is reactivated, to either start out from a non-extreme volume or to change the volume only gradually.

After the actuation of the icon clearly related to the replay volume is completed, the statistics of the parameter changes in memory 4 are updated and, also based thereon, an arrangement of the icons on the sliding bar in accordance with FIG. 2-IV is generated.

The data processing system evaluates that last the parameter volume was changed, whereupon the user will often use this icon once again, e.g. for fine corrections. For this reason and in accordance with the history of use, the icon for the volume is arranged in the center of the sliding bar and the two remaining icons are placed at a relatively large distance at the ends. Thus, as it is assumed that the brightness is already relatively high, i.e. an adjustment of the brightness to lower values is more probable than a further increase in the brightness, the icon for the adjustment of the brightness is arranged far to the right while the icon for the zoom position is now replaced by the brightness icon.

The data processing device of the present invention thus executes the method such that based on current parameter values it is also anticipated which change is more probable. It is also mentioned that, where applicable, it can be concluded from a statistical evaluation of typical parameter values that a specific user will always operate a specific device with maximum volume, minimum brightness, etc., and the icons can be accordingly placed depending on the history.

Moreover, it is also mentioned that, where applicable, further sensors are simultaneously evaluated, for example, a background brightness sensor provided on the data processing system or the display whose brightness should be changed. If applicable, it can even be intended that parameters typically selected by a user in a sensor-dependent manner are taken into consideration for selecting the desired order and/or that the icon order is responsive to changes in the sensor values in order to place, e.g., the icon relating to the display brightness in the center for changes to the environmental brightness.

In the present case, after the automatic new-determination of the icon order, the display brightness is further increased by the user, even if this was not expected in accordance with the statistics of the previous uses and the detected sensor value. This is caused in that the user moves his/her finger across the representation of the icon on the touch screen to the right, but only a short distance until the end of the sliding bar. In order to allow a further increase regardless of reaching the end of the sliding bar, it is detected how long the user leaves his/her finger over the icon, and a corresponding increase in the brightness is performed. At the same time, the speed of the brightness change can be adapted to the pressure applied by the user to the touch-sensitive monitor. This pressure can either be determined in that signals are detected from a relatively large surface, which indicates that the user presses his/her finger firmly against the monitor and/or the contact pressure can be detected by the pressure-sensitive monitor. Experience has shown that users who want to effect a relatively great change often press the monitor more strongly.

After completion of the adjustment, the maximum brightness has been achieved. Therefore, the icon for the brightness adjustment is selected which shows that a change is only possible for reducing the brightness. Since it has been adjusted immediately before, the icon for the brightness is arranged in the center of the sliding bar, the icon for the volume closely next to it, namely in view of the fact that also when actuating the brightness icon only a movement thereof to the left makes sense, and the zoom icon is still arranged far to the left. Hence, the desired order is selected here, thereby taking into account a still possible adjustment and, as shown in particular by the position of the loudspeaker icon, in view of the size of a different parameter, i.e. here a parameter different from the volume, namely for volume as a foreign parameter, here the brightness.

The rules according to which the position on the sliding bar display is determined, or the position on a grid place along the sliding bar, thus consider i.a. the own parameter value, the frequency of use, the parameter values of other functions of which icons should likewise be arranged on the sliding bar and, if applicable, characteristic numbers which detect sensor values such as the background brightness, etc. By weighting individual characteristic numbers, a respective mean value for the respective function can be determined on the basis of the respectively corresponding characteristic numbers, and the icons can thus be assigned to specific grid positions.

It is now assumed that the zoom adjustment of the camera should be changed from wide angle to tele. This can be done, for example, by touching the icon several times, wherein all adjustments are cyclically run through, without having to move the icon along the sliding bar.

Thus, the arrangement shown in FIG. 2-IX is achieved, wherein irrespective of the fact that the zoom factor was last adjusted, the icon assigned to the zoom factor is not arranged in the center of the sliding bar because the corresponding characteristic number for the last use of the zoom factor is only weighted little. Thus, it is possible to weight different parameters differently.

FIG. 3 shows how an icon "B" is moved from left to right on the sliding bar, wherein icons "A" and "C" are shown in a semi-transparent manner during the movement. Icon "B" is moved up to the position at which icon "C" is already located. The parameter change of the parameter belonging to icon "B" is terminated there. In order to obtain a display in which icon "B" is not displayed directly over icon "C", the displayed position of icon "C" is changed without the parameter belonging to icon "C" changing as well.

The invention claimed is:

1. A method for the parameter change of parameterized functions for technical devices by means of a data processing device comprising a pointing means and a display of a touch-sensitive device in which a sliding bar with corresponding sliding element is shown for the parameter change, said method comprising the steps that
it is detected if the pointing means is actuated for the parameter change, and
a parameter change is made on the basis of the detected pointing means actuation,
wherein a plurality of icon images are saved on the data processing device for a plurality of parameters, which can each be uniquely assigned to the respective parameterized functions,
a plurality of the saved icons to be uniquely assigned are loaded for different parameters,
a desired order of the icons on the sliding bar is determined,
a display with the sliding bar and a plurality of icons arranged thereon according to the determined desired order is generated,
it is detected if the pointing means is positioned on one of the icons and the pointing means is actuated and, in response,
a parameter change is made on the basis of a current parameter size of the parameterized function assigned to the selected icon,
wherein, when a parameter change has been completed, the desired order of the icons on the sliding bar is newly determined in a manner dependent on the parameter size, whereupon icons on the sliding bar are automatically repositioned without the automatic repositioning involving a parameter change,
a desired position of the icons is further determined by taking into account the use statistics, wherein icons which are assigned to parameterized functions that have recently been changed are assigned a central position and icons which are used rarely are assigned an outer position on a sliding bar,
wherein the respectively assigned sliding bar end is selected depending on whether other icons to be arranged on the sliding bar are assigned to parameterized functions with parameters that should typically be increased or cannot be lowered any further and wherein at least one of the desired position and/or the desired order of the plurality of icons on the sliding bar is determined by taking into account a plurality of influences and/or wherein a selection of the icons, which are on the sliding bar, can be configured by a user.

2. The method according to claim 1, wherein icons which are assigned to parameterized functions with parameters that cannot be increased any further are assigned, depending on an orientation of the display, a position at the right or upper end of a sliding bar and icons which are assigned to parameterized functions with parameters that cannot be lowered any further are assigned a position at the left or lower end of the sliding bar.

3. The method for the parameter change of parameterized functions for technical devices according to claim 2 wherein the parameterized functions comprise at least one of brightness, color saturation, contrast display.

4. The method for the parameter change of parameterized functions for technical devices according to claim 3 wherein at least one of the technical devices whose parameterized functions should be changed is a camera, and wherein parameterized functions comprise at least one of camera image parameters brightness, color saturation and contrast display and/or
wherein parameterized functions comprise a camera zoom factor.

5. The method for the parameter change of parameterized functions for technical devices according to claim 4 wherein the data processing device is a mobile data processing device with a touch screen; and the technical devices whose parameterized functions should be changed are included in this data processing device.

6. The method according to claim 5, wherein for a parameterized function a plurality of icons to be uniquely assigned to it are provided and the method comprises the step of
selecting one of these icons in response to one of the following conditions:
multistep-variable parameter that cannot be increased further,
multistep-variable parameter that cannot be lowered further,
technical device deactivated,
technical device activated
and wherein at least one of the group:
changing the size of icons to make currently non-used icons smaller than
currently used icons,
de-coloring the currently non-used icons,
fading- out the currently non-used icons, and
displaying the currently non-used icons to semi-transparent
is effected in response to the detection that the pointing means is pointed to one of the icons and the pointing means is actuated; and
a parameter change is made on the basis of the current parameter size of the parameterized function assigned to the selected icon.

7. The method according to claim 6, wherein a sensitivity of the parameter change, upon actuation of the pointing means, is selected dependent on a duration of the pointing means actuation and/or a movement of the pointing means actuation and/or an intensity of the pointing means actuation and/or a distance of the pointing means from the sliding bar.

8. The method according to claim 1, wherein a sensitivity of the parameter change, upon actuation of the pointing means, is selected dependent on a duration of the pointing means actuation and/or a movement of the pointing means actuation and/or an intensity of the pointing means actuation and/or a distance of the pointing means from the sliding bar.

* * * * *

UNITED STATES PATENT AND TRADEMARK OFFICE
CERTIFICATE OF CORRECTION

PATENT NO. : 10,191,638 B2
APPLICATION NO. : 14/383381
DATED : January 29, 2019
INVENTOR(S) : Ralf Hinkel Page 1 of 1

It is certified that error appears in the above-identified patent and that said Letters Patent is hereby corrected as shown below:

On the Title Page

Item [22], PCT Filed: "Mar. 3, 2013" should be – Mar. 5, 2013 –

Signed and Sealed this
Twenty-third Day of July, 2019

Andrei Iancu
*Director of the United States Patent and Trademark Office*